United States Patent [19]

Hanson

[11] Patent Number: 5,369,957
[45] Date of Patent: Dec. 6, 1994

[54] METHOD AND APPARATUS FOR CHECKING THE POSITION AND CONDITION OF A TEMPERATURE SENSOR IN A REFRIGERATION SYSTEM

[75] Inventor: Jay L. Hanson, Bloomington, Minn.

[73] Assignee: Thermo King Corporation, Minneapolis, Minn.

[21] Appl. No.: 175,848

[22] Filed: Dec. 30, 1993

[51] Int. Cl.[5] ............................ F25B 49/02
[52] U.S. Cl. ............................ 62/126; 62/129; 62/229; 236/91 F
[58] Field of Search ............... 62/125, 126, 127, 129, 62/130, 227, 229, 160; 236/94, 91 R, 91 F, 91 E, 91 D; 165/11.1, 26; 364/551.01, 557, 184, 185, 187

[56] References Cited

U.S. PATENT DOCUMENTS

| | | | |
|---|---|---|---|
| 4,249,238 | 2/1981 | Spang, III et al. | 364/185 X |
| 4,337,516 | 6/1982 | Murphy et al. | 364/551.01 |
| 4,381,549 | 4/1983 | Stamp, Jr. et al. | 165/11.1 X |
| 4,432,210 | 2/1984 | Saito | 62/126 |
| 4,535,598 | 8/1985 | Mount | 62/126 |
| 4,736,597 | 4/1988 | Anderson et al. | |
| 5,115,643 | 5/1992 | Hayata et al. | 62/126 |
| 5,123,252 | 6/1992 | Hanson . | |

*Primary Examiner*—Harry B. Tanner
*Attorney, Agent, or Firm*—M. G. Panian

[57] ABSTRACT

Methods and apparatus for checking the position and condition of a return air temperature sensor in a refrigeration system. The refrigeration system draws air from a served space in heat exchange relation with an evaporator coil, and discharges conditioned air into the served space, to maintain a predetermined set point temperature SP via selectable refrigeration cycles. The return air sensor provides a value RA responsive to the temperature of the air on the return side of the evaporator coil. A discharge air temperature sensor provides a value DA responsive to the temperature of the air on the discharge side of the evaporator coil, an evaporator coil temperature sensor provides a value ECT responsive to the temperature of the evaporator coil, and an ambient air temperature sensor provides a value AA responsive to the temperature of the ambient air. A dynamic constant C1 responsive to the AA and to the selected refrigeration cycle is provided, and a difference value D responsive to the difference between RA and ECT is determined. D and C1 are compared, and it is determined if DA and ECT indicate a stable operating condition of the selected refrigeration cycle. An alarm is provided which indicates that the return air temperature sensor should be checked when D exceeds C1 during a stable operating condition of the selected refrigeration cycle.

20 Claims, 5 Drawing Sheets

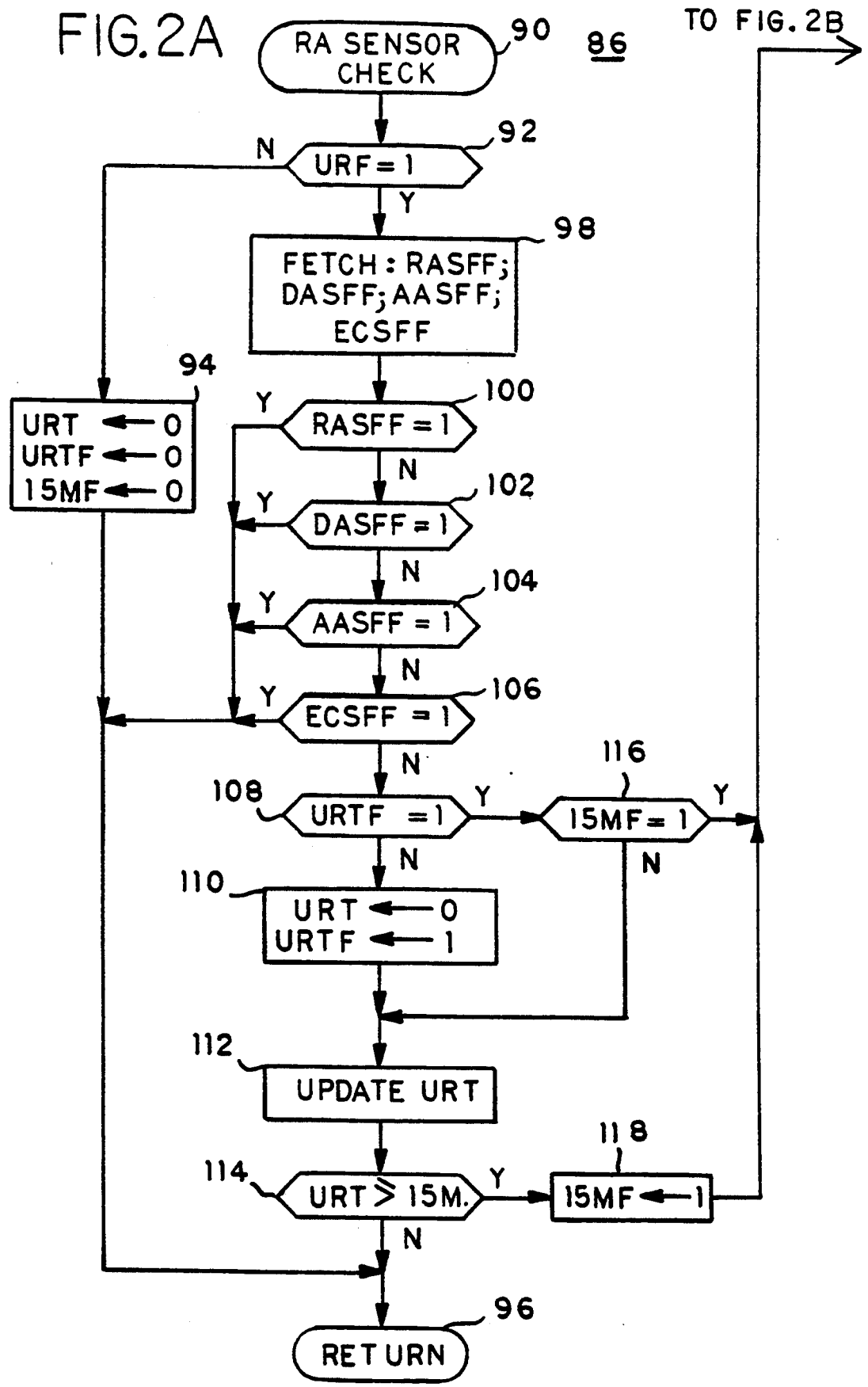

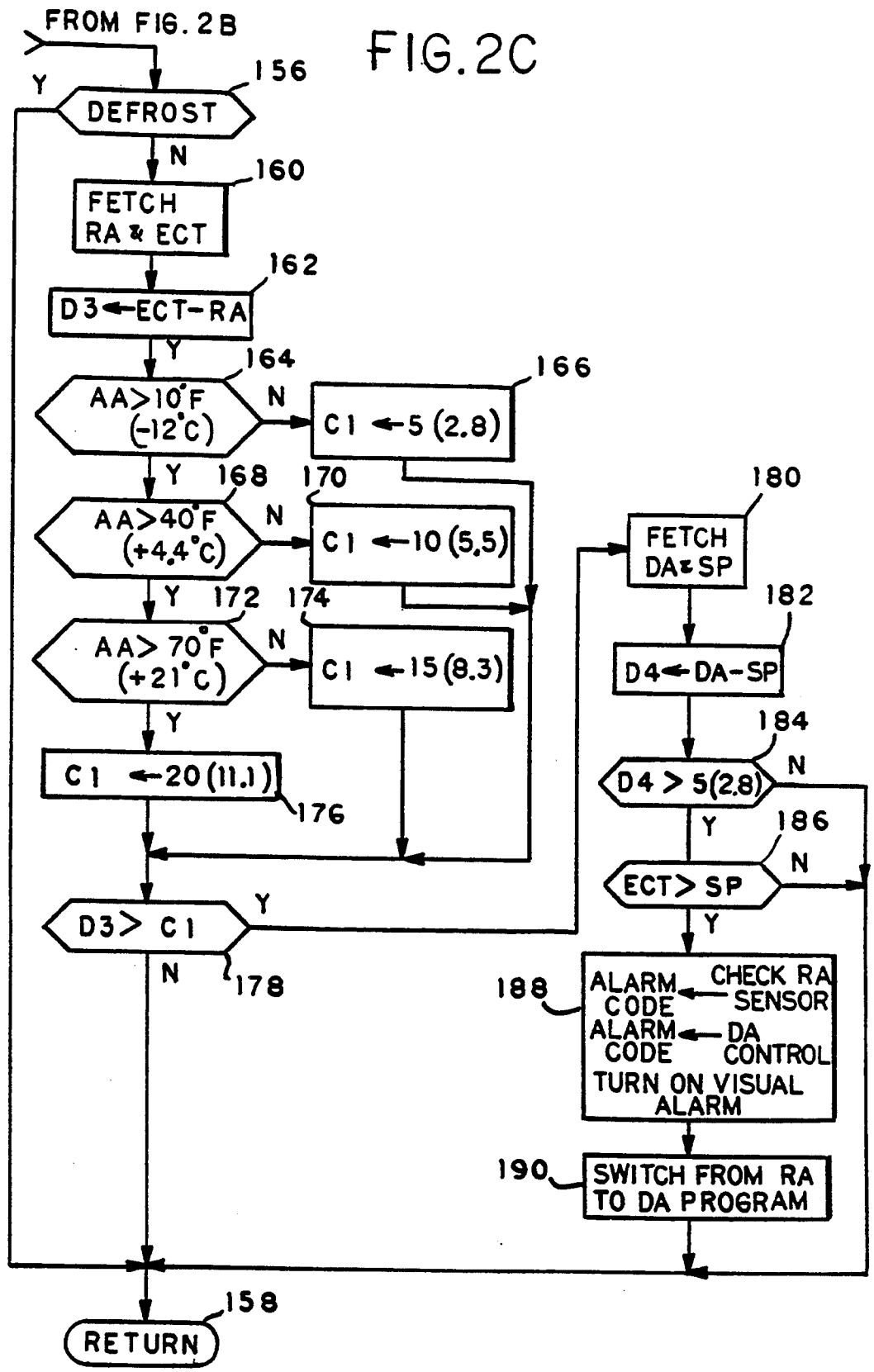

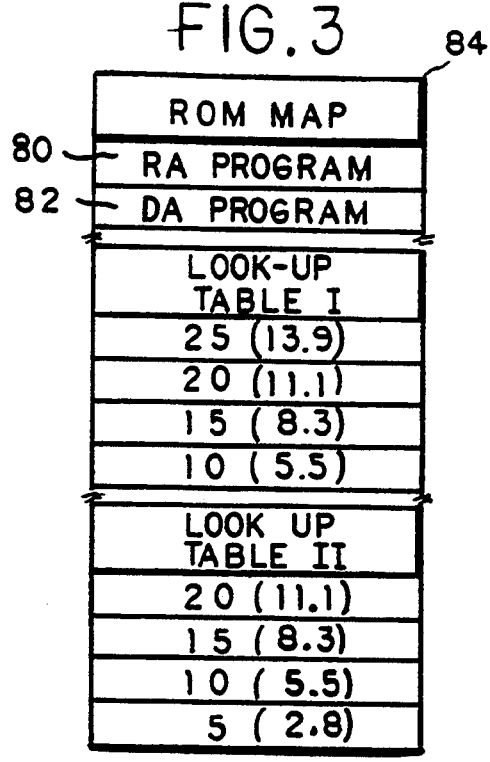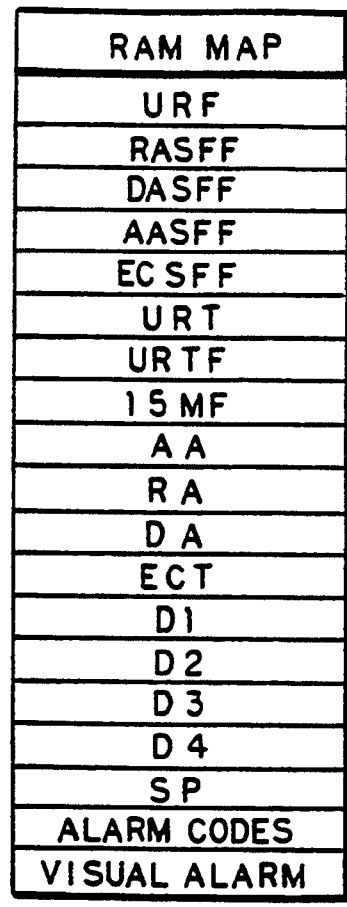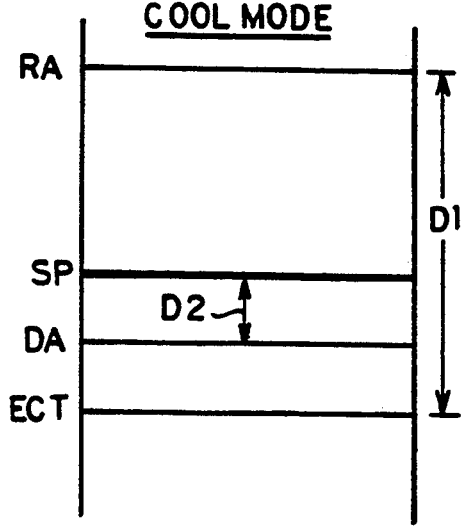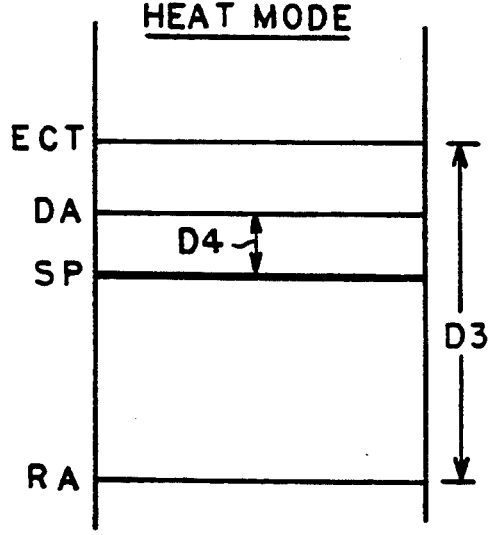

METHOD AND APPARATUS FOR CHECKING THE POSITION AND CONDITION OF A TEMPERATURE SENSOR IN A REFRIGERATION SYSTEM

TECHNICAL FIELD

The invention relates in general to refrigeration systems, and more specifically methods and apparatus for detecting when a temperature sensor is not responding properly to air returning from a served space to the refrigeration system, such as due to an out-of-position return air temperature sensor.

BACKGROUND ART

In a refrigeration system which draws air from a served space through an evaporator coil, and which discharges conditioned air back into the served space, the position and condition of a controlling temperature sensor is critical. This is especially true for a transport refrigeration system, which is usually controlled in response to the temperature of air returning to the evaporator coil. The return air temperature sensor is located in a lower portion of the served space. If the return air temperature sensor is improperly positioned, or pushed or forced out of position, such as during loading of the served space, or subsequent shifting of the load, the temperature of the served space will not be controlled to the desired temperature range adjacent to a selected set point temperature SP, and damage to the load may occur. A return air temperature sensor which has drifted out of an allowable tolerance will present the same problem.

Thus, it would be desirable, and it is an object of the present invention, to be able to detect when a return air temperature sensor is not responding correctly to air returning to an evaporator coil of a refrigeration system from a served space, due either to incorrect positioning of the return air sensor in the return air flow path, or to drifting of the return air temperature sensor out of an allowable tolerance.

SUMMARY OF THE INVENTION

Briefly, the present invention includes a method of checking the position and condition of a return air temperature sensor in a refrigeration system which draws air from a served space in heat exchange relation with an evaporator coil, and discharges conditioned air into the served space, to maintain the temperature of the served space in a predetermined temperature range adjacent to a predetermined set point temperature SP via selectable refrigeration cycles. The return air sensor provides a value RA responsive to the temperature of the air on the return side of the evaporator coil. The refrigeration system also includes a discharge air temperature sensor which provides a value DA responsive to the temperature of the air on the discharge side of the evaporator coil, an evaporator coil temperature sensor which provides a value ECT responsive to the temperature of the evaporator coil, and an ambient air temperature sensor which provides a value AA responsive to the temperature of the ambient air.

The method further includes the steps of: providing a dynamic constant C1 having a magnitude responsive to AA and the selected refrigeration cycle; providing a difference value D1 in response to the difference between RA and ECT; determining if DA and ECT indicate a stable operating condition of the selected refrigeration cycle; comparing D1 and C1; and providing an alarm which indicates the return air temperature sensor should be checked when D1 exceeds C1, and the determining step finds that DA and ECT indicate a stable operating condition of the selected refrigeration cycle.

The invention also includes a refrigeration system which draws air from a served space in heat exchange relation with an evaporator coil, and discharges conditioned air into the served space, to maintain the temperature of the served space in a predetermined temperature range adjacent to a predetermined set point temperature SP via selectable refrigeration cycles. The refrigeration system includes a return air temperature sensor which provides a value RA responsive to the temperature of the air on the return side of the evaporator coil, a discharge air temperature sensor which provides a value DA responsive to the temperature of the air on the discharge side of the evaporator coil, an evaporator coil temperature sensor which provides a value ECT responsive to the temperature of the evaporator coil, and an ambient air temperature sensor which provides a value AA responsive to the temperature of the ambient air. First means provides a dynamic constant C1 having a magnitude responsive to AA and the selected refrigeration cycle, second means provides a difference value D1 in response to the difference between RA and ECT, third means determines if DA and ECT indicate a stable operating condition of the selected refrigeration cycle, and fourth means compares D1 and C1. Fifth means provides an alarm which indicates the return air temperature sensor should be checked when the fourth means finds the difference D1 exceeds C1, and the third means finds that DA and ECT indicate a stable operating condition of the selected refrigeration cycle.

BRIEF DESCRIPTION OF THE DRAWINGS

The invention will become more apparent by reading the following detailed description in conjunction with the drawings, which are shown by way of example only, wherein:

FIGS. 2A, 2B and 2C may be assembled to provide a flow diagram of a computer program which implements the teachings of the invention, which may be utilized by a microprocessor based temperature controller shown in FIG. 1;

FIG. 3 is a ROM map illustrating selectable operating programs and look-up tables which may be stored in a read-only memory (ROM) shown in FIG. 1 and accessed by the program shown in FIGS. 2A, 2B, and 2C;

FIG. 4 is a RAM map illustrating temperature sensor values, timers, flags, and other variables, which are utilized by, and/or produced by, the program shown in FIGS. 2A, 2B and 2C;

FIG. 5 is a graph useful in understanding the program of FIGS. 2A, 2B and 2C when the refrigeration system of FIG. 1 is operating in a cooling cycle or mode; and FIG. 6 is a graph useful in understanding the program of FIGS. 2A, 2B and 2C when the refrigeration system of FIG. 1 is in a heating cycle or mode.

DESCRIPTION OF PREFERRED EMBODIMENTS

Figure 1:
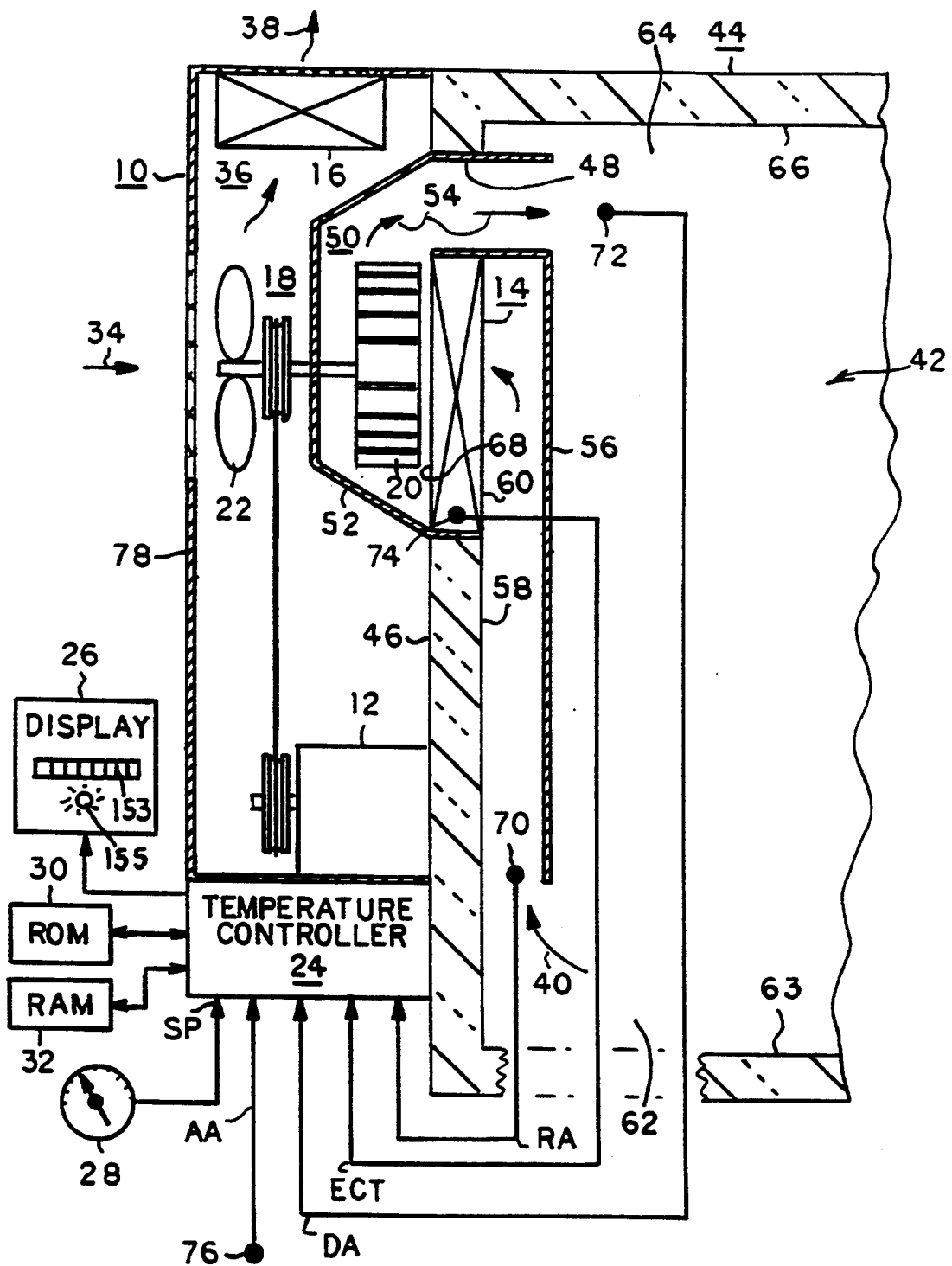
FIG. 1 is an elevational view, shown partially in section, of a refrigeration system which may be constructed and operated according to the teachings of the invention.

Referring now to the drawings, and to FIG. 1 in particular, there is shown a refrigeration system or unit 10 which may be constructed and operated according to the teachings of the invention. The structural arrangement of refrigeration system 10, for purposes of example, is similar to the structural arrangement of a refrigeration system shown in U.S. Pat. No. 4,736,597, which is assigned to the same assignee as the present application. The refrigerant flow paths of refrigeration system 10 may be configured according to a refrigeration piping diagram shown in U.S. Pat. No. 5,123,252. U.S. Pat. Nos. 4,736,597 and 5,123,252 are hereby incorporated into the specification of the present application by reference. The components of refrigeration system 10 include a prime mover and refrigerant compressor, shown generally at 12, an evaporator coil 14, a condenser coil 16, air mover means 18 which includes an evaporator blower 20 and a condenser fan 22, and a microprocessor based temperature controller 24.

The microprocessor based temperature controller 24, which may be constructed as shown in detail in the hereinbefore mentioned U.S. Pat. No. 5,123,252, includes a display 26, a set point temperature selector 28, a read-only memory (ROM) 30, and a random-access memory (RAM) 32. Set point temperature selector 28 provides a signal or value SP for temperature controller 24.

Condenser fan 22 is located to draw ambient air 34 into a condenser plenum 36, where it flows in heat exchange relation with condenser coil 16. Heated air 38 is discharged back to ambient.

Evaporator blower 20 is located to draw air 40, hereinafter called return air 40, from a served space 42, which, for example, may be defined by a vehicle 44, such as a truck, trailer or container. Refrigeration system 10 may be mounted on a vertical wall 46 of vehicle 44, with wall 46 having an opening 48 therein through which return air 40 is drawn in heat exchange relation with evaporator coil 20 into an evaporator plenum 50. A bulkhead member 52 separates the condenser plenum 36 from the evaporator plenum 50. Conditioned air 54, hereinafter called discharge air 54, is discharged back into served space 42 through opening 48.

A bulkhead 56 is disposed within served space 42, in spaced relation with an inner surface 58 of wall 46 to direct return air 40 into a return air side 60 of evaporator coil 14 from a return air path 62 located near a bottom portion 63 of served space 42. Bulkhead 56 also separates the return air path 62 from a discharge air path 64, which is near a top portion 66 of served space 42, preventing short cycling of the discharge air 54 which leaves a discharge air side 68 of evaporator coil 14.

Refrigeration system 10 includes a return air temperature sensor 70, a discharge air temperature sensor 72, an evaporator coil temperature sensor 74, and an ambient air temperature sensor 76. Return air temperature sensor 70 is located within the return air flow path 62 near the bottom portion 64 of served space 42, and it provides a signal or value RA for temperature controller 24 responsive to the temperature of return air 40. Discharge air temperature sensor 72 is located within the discharge air flow path 64 near the top portion 66 of served space 42, and it provides a signal or value DA for temperature controller 24 responsive to the temperature of the discharge air 54. Evaporator coil temperature sensor 74 is disposed to contact a predetermined surface of evaporator coil 14, and it provides a signal or value ECT for temperature controller 24 responsive to the temperature of evaporator coil 14. Ambient air temperature sensor 76 is disposed outside of a housing portion 78 of refrigeration system 10, in a location to obtain a true indication of the temperature of ambient air 34.

Temperature controller 24 includes selectable first and second algorithms, hereinafter respectively called return air and discharge air programs 80 and 82, which are illustrated generally in a ROM map 84 shown in FIG. 3. Suitable return air and discharge air algorithms or programs are described in detail in the hereinbefore mentioned U.S. Pat. No. 5,123,252, and are thus not shown in detail. In general, the return air program 80 and the discharge air program 82 both control the temperature in served space 42 to a predetermined temperature range adjacent to the selected set point temperature SP, with the return air temperature program 80 comparing the return air temperature RA with the set point temperature SP, and with the discharge air temperature program 82 comparing the discharge air temperature DA, with the selected set point temperature SP. This comparison provides an error signal which is used to initiate different cooling and hot gas heating cycles, as required to hold the temperature of served space 42 close to the selected set point temperature SP.

A program which checks temperature sensors 70, 72, 74 and 76 for failure sets appropriate sensor fail flags in RAM 32. A suitable sensor checking program is illustrated in the hereinbefore mentioned U.S. Pat. No. 5,123,252. When the return air temperature sensor 70 is not open or shorted, and it is providing a plausible signal, the return air program 80 is used to control the temperature of served space 42. When return air temperature sensor 70 is open or shorted, or it is not is providing a plausible signal, then the discharge air program 82 is used to control the temperature of served space 42.

It is possible, however, for the return air temperature sensor 70 to be indicated as functioning properly by a sensor checking program, and then not installed in the correct location of the return air flow path 62. It is also possible for the return air temperature sensor 70 to be pushed out of the correct location after initial installation during loading or shifting of cargo carried in conditioned space, due to the relatively low location of return air temperature sensor 70 in served space. It is also possible for the output signal from return air temperature sensor 70 to drift out of an allowable tolerance. If return air temperature sensor 70 is not responding correctly to the temperature of a cargo carried in served space 42, for any of the reasons set forth, then it is possible for a temperature sensitive perishable cargo in served space 42 to be damaged.

The present invention includes methods and apparatus for continuously checking the operation of the return air sensor 70, to insure that it is responding properly to the temperature of served space 42, which methods and apparatus do not require that the return air temperature sensor be open or shorted, or be providing an implausible signal, before making a determination that the operating program should be switched from the return air program 80 to the discharge air program 82.

Figure 2B:
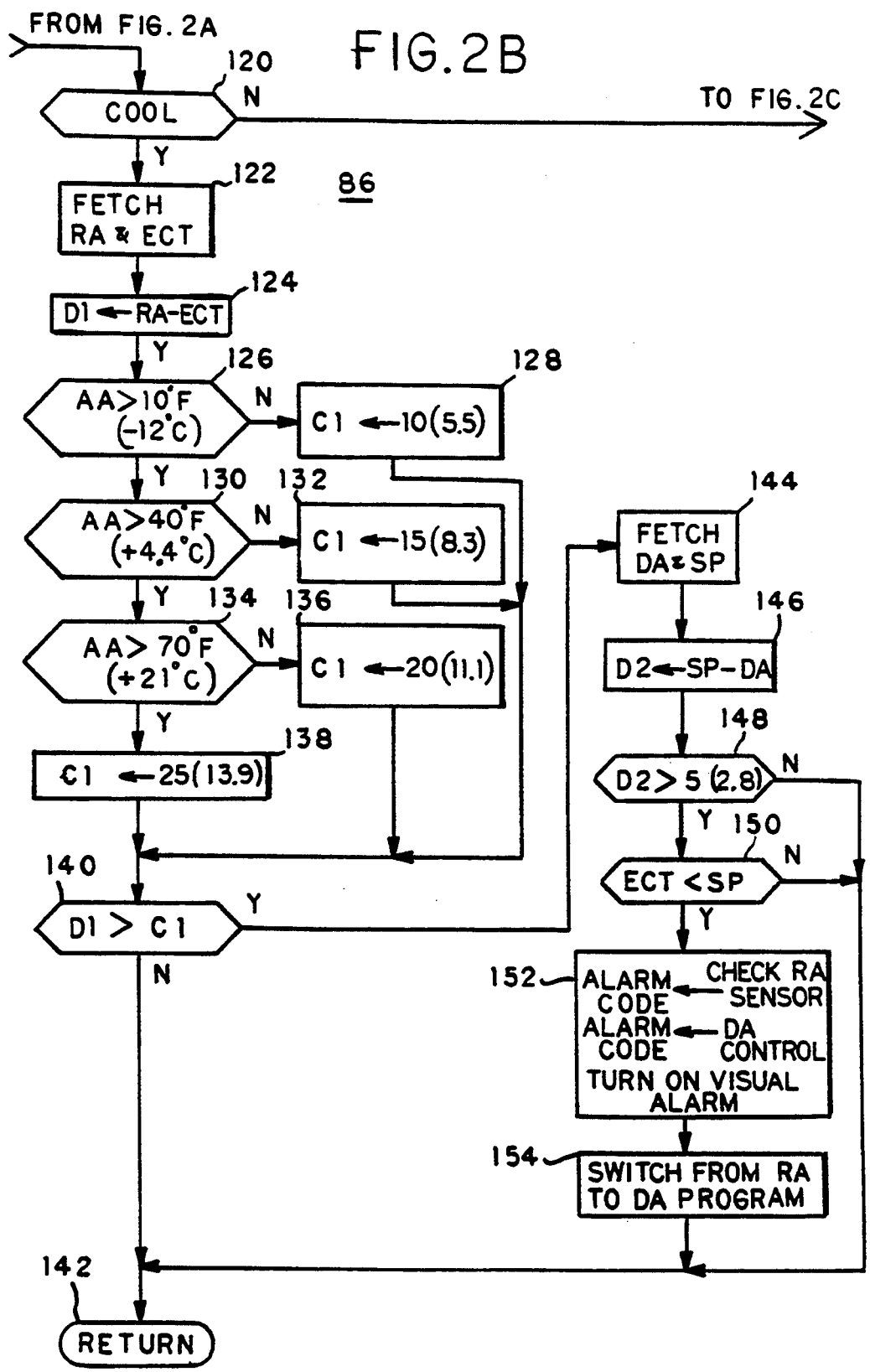

FIGS. 2A, 2B and 2C may be combined to provide a return air sensor check program 86 constructed according to the teachings of the invention, which illustrate the methods of the invention, as well as the functions to be performed when the invention is implemented via apparatus. The hereinbefore mentioned ROM map 84 shown in FIG. 3, as well as a RAM map 88 shown in FIG. 4, will be referred to during the description of return air sensor check program 86. ROM map 84 illustrates the storage of the return air and discharge air operating programs 80 and 82, as well as look-up tables I and II which may be accessed during the running of return air sensor check program 86. RAM map 88 illustrates program flags, timers, and other program variables generated during the running of return air sensor check program 86, as well as input and output signals associated with the running of return air sensor check program 86.

Return air sensor check program 86 is entered periodically at 90 and step 92 checks a unit running flag URF in RAM 32. Flag URF is a logic one when refrigeration unit or system 10 is running, and a logic zero when it is not running. When step 92 finds refrigeration system 10 not running, step 94 resets certain program variables, including a unit running timer URT, which logs running time, a unit running timer flag URTF, and a 15 minute running time flag 15MF. Program 86 then exits at return 96 and awaits step 92 finding that the unit running flag URF is a logic one.

When step 92 finds refrigeration system 10 operating, step 98 fetches sensor failure flags RASFF, DASFF, ECSFF and AASFF from RAM 32, which are respectively associated with return air temperature sensor 70, discharge air temperature sensor 72, evaporator coil temperature sensor 74 and ambient air temperature sensor 76. The sensor failure flags are set by the hereinbefore mentioned sensor checking program described in U.S. Pat. No. 5,123,252 when the sensor check program finds a sensor has failed, or is providing an implausible signal. Steps 100, 102, 104 and 106 successively check the sensor failure flags, and if any of these four temperature sensors has failed, program 86 exits at return 96. The programs of U.S. Pat. No. 5,123,252 effectively deal with failures of the sensors, controlling the temperature of served space 42 with the return air temperature sensor 70 and RA program 80 when flag RASFF is a logic zero, controlling with the discharge air sensor 72 and DA program 82 when flag RASFF is a logic one and flag DASFF is a logic zero, and controlling with an evaporator coil temperature switch (not shown) when flags RASFF and DASFF are both a logic one.

When all four temperature sensors are found to be operational, step 108 determines if a unit running timer flag URTF has been set. If flag URTF is not set, refrigeration system 10 has just been started, and it is too soon to check return air temperature sensor 70 for incorrect positioning, or for drift. When step 108 finds flag URTF not set, step 110 zeros a unit running timer URT, which may be a software timer stored in RAM 32, and the unit running timer flag URTF is set, to indicate that the unit running timer URT has been activated. Step 112 then updates the unit running timer URT and step 114 determines if the unit running timer URT has reached a running time long enough for stable operation to be achieved, such as 15 minutes, for example. If refrigeration system 10 has not been operating for 15 minutes, step 114 proceeds to program return 96.

Upon the next running of program 86, step 108 will now find the unit running timer flag URTF has been set, and step 108 branches to step 116 which checks a 15 minute running time flag 15MF. Flag 15MF is set after refrigeration system 10 has operated for the exemplary 15 minute time period. At this stage, flag 15MF will not be set, and step 116 goes to step 112, to update the unit running timer URT.

After refrigeration system 10 has operated for 15 minutes, step 114 will branch to step 118, which sets flag 15MF, and step 118 advances to step 120 in FIG. 2B. Subsequent runs through program 86 will reach step 116, which will find flag 15MF set, and step 116 then advances directly to step 120 in FIG. 2B.

The portion of program 86 shown in FIG. 2A determines that the sensors required for the operation of program 86 are functional, and that refrigeration system 10 has operated for a sufficient period of time to be in a stable condition. FIG. 2B implements a portion of program 86 which checks the return air temperature sensor 70 for proper response during a cooling cycle, and FIG. 2C implements a portion of program 86 which checks return air sensor 70 for proper response during a heating cycle.

More specifically, step 120 determines if refrigeration system 10 is in a cooling cycle or in a heating cycle, advancing to step 122 when refrigeration system 10 is in a cooling cycle, and advancing to FIG. 2C when refrigeration system 10 is in a heating cycle. Step 122 fetches the latest values of the return air temperature RA and the evaporator coil temperature ECT, both of which are stored in RAM 32. Step 124 subtracts ECT from RA to provide a difference value D1, which is stored in RAM 32. Difference value D1 is compared with a dynamic constant C1, with the value of the dynamic constant C1 being responsive to the ambient temperature AA. The value of C1 for identical ambient temperatures is different in FIGS. 2B and 2C, and thus the value of the dynamic constant C1, in addition to being responsive to the ambient temperature AA is also responsive to the type of refrigeration cycle currently being implemented by refrigeration system 10.

Step 126 determines if AA is greater than 10° F. (−12° C.). If AA is not greater than 10° F. (−12° C.), step 126 goes to step 128 which sets the value of the dynamic constant C1 to 10, when Fahrenheit is used in the determination of D1, and to 5.5 when Celsius is used.

When step 126 finds that AA exceeds 10° F. (−12° C.), step 126 proceeds to step 130 which determines if AA is greater than 40° F. (4.4° C.). When step 130 finds that the ambient temperature AA does not exceed 40° F. (4.4° C.), step 130 goes to step 132 which sets C1 to 15, when Fahrenheit is used in the determination of D1, and to 8.3 when Celsius is used.

When step 130 finds that AA exceeds 40° F. (4.4° C.), step 130 proceeds to step 134 which determines if AA is greater than 70° F. (21° C.). When AA does not exceed 70° F. (21° C.), step 134 goes to step 136 which sets C1 to 20, when Fahrenheit is used in the determination of D1, and to 11.1 when Celsius is used.

When step 134 finds that AA exceeds 70° F. (21° C.), step 134 proceeds to step 138 which sets C1 to 25, when Fahrenheit is used in the determination of D1, and to 13.9 when Celsius is used.

The values for constant C1 provided in steps 128, 132, 136 and 138 are also listed in look-up table I shown in ROM map 84 of FIG. 3. Thus, steps 128, 133, 136 and 138 may contain vectors to different addresses of look-up table I, to obtain the required values of C1 during a cooling cycle.

Steps 128, 132, 136 and 138 each proceed to step 140 which compares the value D1 with the dynamic constant C1 just determined in steps 126 through 138. If the difference value D1 does not exceed the value of the dynamic constant C1, the return air sensor 70 is responding properly to the return air 40 during a cooling cycle, and program 86 exits at return 142.

Should the difference value D1 exceed the dynamic constant C1, step 140 proceeds to a portion of program 86 which determines if refrigeration system 10 is operating in a stable cooling cycle. FIG. 2A determined that refrigeration system 10 has been operating for a sufficient period of time to proceed with an evaluation of the return air sensor 70, but the program of FIG. 2A does not determine how long refrigeration unit 10 has been operating in any specific operating mode or cycle. It would be possible for program 86 to "time" how long refrigeration system 10 has been operating in a cooling cycle, and decide that refrigeration system 10 is operating in a stable cooling mode after a predetermined period of time. It is preferred, however, that the determination of a stable cooling cycle operation be determined directly from the values of certain of the other temperature sensors.

More specifically, the determination of a stable cooling cycle is initiated by fetching DA and SP from RAM 32 in step 144. Step 146 subtracts DA from SP to provide a difference value D2, which is stored in RAM 32. Step 148 compares the difference value D2 with a predetermined constant C2. Constant C2 may be a fixed constant, such as 5, when Fahrenheit is used in the determination of D2, and 2.8 when Celsius is used. The value of constant C2 is selected such that if D2 does not exceed C2, it indicates that refrigeration system 10 is still in a transient condition between a heating cycle and the cooling cycle. Thus, upon step 148 finding that D2 does not exceed C2, step 148 exits program 86 at return 142.

When step 148 finds that D2 exceeds C2, a first test of a stable cooling cycle has been passed, and step 150 sets up a second test. As shown in the chart of FIG. 5, during a stable cooling mode the temperature RA of the return air 40 and the temperature ECT of evaporator coil 14 are on opposite sides of the selected set point temperature. In a cooling cycle, RA is above SP, and ECT should be below it. If refrigeration system 10 has not been operating long enough after a heating or a defrost cycle, ECT may still be above SP, and an accurate check of return air sensor 70 cannot be made. Thus, step 150 determines if ECT is below SP. If it is not, step 150 proceeds to the program return 142. When step 150 passes the second test of a stable cooling cycle, then the high difference value D1, found in the "yes" branch of step 140, means that return air temperature sensor 70 is not responding correctly to the temperature of served space 42 during a stable cooling cycle.

The abnormally high difference value D1 while refrigeration system 10 is operating in a stable cooling cycle results in program 86 advancing to step 152. Step 152 sets an alarm code in RAM 32 which identifies the return air sensor 70 as the cause of the alarm. Alarm codes may be displayed on an alpha-numeric read-out portion 153 of display 26 in response to interrogations by authorized personnel. Step 152 also stores another alarm code in RAM 32 which indicates that refrigeration system 10 has been switched from RA control to DA control. Step 152 also stores an output in RAM 32 which results in the illumination and/or flashing of a visual alarm indicator 155 on display 26. The visual alarm 155 prompts authorized personnel to check for alarm codes. Step 152 advances to step 154 which switches the operation of refrigeration system 10 from the return air operating program 80 stored in ROM 30, to the discharge air operating program 82, also stored in ROM 30. Program 86 then exits at return 142.

When step 120 finds refrigeration system 10 operating in a hot gas heating cycle, step 120 proceeds to step 156 in FIG. 2C. Step 156 determines if refrigeration system 10 is operating in a defrost cycle, i.e., hot gas heating of evaporator coil 14 to remove ice build up on evaporator coil 14. If system 10 is operating in a defrost cycle, an effective evaluation of return air temperature sensor 70 can not be made, and program 86 exits at program return 158.

When step 156 finds that refrigeration system 10 is not operating in a defrost cycle, step 156 proceeds to step 160. Step 160 fetches the latest values of the return air temperature RA and the evaporator coil temperature ECT, both of which are stored in RAM 32. Step 162 subtracts RA from ECT to provide a difference value D3, which is stored in RAM 32. Difference value D3 is compared with the dynamic constant C1, with the value of the dynamic constant C1 during a heating cycle also being responsive to the ambient temperature AA. As stated relative to the cooling cycle portion of program 86 shown in FIG. 2B, the value of C1 for identical ambient temperatures is different in FIGS. 2B and 2C, and thus the value of the dynamic constant C1, in addition to being responsive to the ambient temperature AA is also responsive to the type of refrigeration cycle currently being implemented by refrigeration system 10.

Step 164 determines if AA is greater than 10° F. (−12° C.). If AA is not greater than 10° F. (−12° C.), step 164 goes to step 166 which sets the value of the dynamic constant C1 to 5, when Fahrenheit is used in the determination of D3, and to 2.8 when Celsius is used.

When step 164 finds that AA exceeds 10° F. (−12° C.), step 164 proceeds to step 168 which determines if AA is greater than 40° F. (4.4° C.). When step 168 finds that the ambient temperature AA does not exceed 40° F. (4.4° C.), step 168 goes to step 170 which sets C1 to 10, when Fahrenheit is used in the determination of D3, and to 5.5 when Celsius is used.

When step 168 finds that AA exceeds 40° F. (4.4° C.), step 168 proceeds to step 172 which determines if AA is greater than 70° F. (21° C.). When AA does not exceed 70° F. (21° C.), step 172 goes to step 174 which sets C1 to 15, when Fahrenheit is used in the determination of D3, and to 8.3 when Celsius is used.

When step 172 finds that AA exceeds 70° F. (21° C.), step 172 proceeds to step 176 which sets C1 to 20, when Fahrenheit is used in the determination of D3, and to 11.1 when Celsius is used.

The values for constant C1 provided in steps 166, 170, 174 and 176 are also listed in look-up table II shown in ROM map 84 of FIG. 3. Thus, steps 166, 170, 174 and 176 may contain vectors to different addresses of look-up table II, to obtain the required values of C1 during a heating cycle.

Steps 166, 170, 174 and 176 each proceed to step 178 which compares the value D3 with the dynamic constant C1 just determined in steps 164 through 176. If the difference value D3 does not exceed the value of the dynamic constant C1, the return air sensor 70 is responding properly to the return air 40 during a heating cycle, and program 86 exits at return 158.

Should the difference value D3 exceed the dynamic constant C1, step 178 proceeds to a portion of program 86 which determines if refrigeration system 10 is operating in a stable heating cycle. FIG. 2A determined that refrigeration system 10 has been operating for a sufficient period of time to proceed with an evaluation of the return air sensor 70, but, as hereinbefore stated, the program of FIG. 2A does not determine how long refrigeration unit 10 has been operating in any specific operating mode or cycle. It would be possible for program 86 to "time" how long refrigeration system 10 has been operating in a heating cycle, and decide that refrigeration system 10 is operating in a stable heating mode after a predetermined period of time. It is preferred, however, as in the case of a cooling cycle, that the determination of a stable heating cycle operation be determined directly from the values of certain of the other temperature sensors.

More specifically, the determination of a stable heating cycle is initiated by fetching DA and SP from RAM 32 in step 180. Step 182 subtracts SP from DA to provide a difference value D4, which is stored in RAM 32. Step 184 compares the difference value D4 with a predetermined constant, which may be the same fixed constant C2 used in the cooling cycle portion of program 86, or a different constant may be used, depending upon the characteristics of refrigeration system 10. For purposes of example it will be assumed that the characteristics of refrigeration system 10 are such that the same fixed constant C2 may be used during a cooling cycle and during a heating cycle. Thus, C2 may be 5 when Fahrenheit is used in the determination of D4, and 2.8 when Celsius is used. As stated relative to the description of FIG. 2B, the value of constant C2 is selected such that if D4 does not exceed C2, it indicates that refrigeration system 10 is still in a transient condition between a cooling cycle and the heating cycle, and upon step 184 finding that D4 does not exceed C2, step 184 exits program 86 at return 158.

When step 184 finds that D4 exceeds C2, a first test of a stable heating cycle has been passed, and step 186 sets up a second test. As shown in the chart of FIG. 6, during a stable heating mode the temperature RA of the return air 40 and the temperature ECT of evaporator coil 14 are on opposite sides of the selected set point temperature. In a heating cycle, RA is below SP and ECT should be above SP. If refrigeration system 10 has not been operating long enough after a cooling cycle, ECT may still be below SP, and an accurate check of return air sensor 70 cannot be made. Thus, step 186 determines if ECT is above SP. If it is not, step 186 proceeds to the program return 158. When step 186 passes the second test of a stable heating cycle, then the high difference value D3, found in the "yes" branch of step 178, means that return air temperature sensor 70 is not responding properly to the temperature of served space 42 during a stable heating cycle.

The abnormally high difference value D3 while refrigeration system 10 is operating in a stable heating cycle results in program 86 advancing to step 188. Step 188 sets an alarm code in RAM 32 which identifies the return air sensor 70 as the cause of the alarm. As stated relative to FIG. 2B, alarm codes may be displayed on the alpha-numeric read-out portion 153 of display 26 in response to interrogations by authorized personnel. Step 188 also stores another alarm code in RAM 32 which indicates that refrigeration system 10 has been switched from RA control to DA control. Step 188 also stores an output in RAM 32 which results in the illumination and/or flashing of the visual alarm indicator 155 on display 26. The visual alarm 155 prompts authorized personnel to check for alarm codes. Step 188 advances to step 190 which switches the operation of refrigeration system 10 from the return air operating program 80 stored in ROM 30, to the discharge air operating program 82, also stored in ROM 30. Program 86 then exits at return 158.

I claim:

1. A method of checking the position and condition of a return air temperature sensor in a refrigeration system which draws air from a served space in heat exchange relation with an evaporator coil, and discharges conditioned air into the served space, to maintain the temperature of the served space in a predetermined temperature range adjacent to a predetermined set point temperature SP via selectable refrigeration cycles, with the return air sensor providing a value RA responsive to the temperature of the air on the return side of the evaporator coil, and including a discharge air temperature sensor which provides a value DA responsive to the temperature of the air on the discharge side of the evaporator coil, an evaporator coil temperature sensor which provides a value ECT responsive to the temperature of the evaporator coil, and an ambient air temperature sensor which provides a value AA responsive to the temperature of the ambient air, comprising the steps of:
providing a dynamic constant C1 having a magnitude responsive to AA and the selected refrigeration cycle,
providing a difference value D1 in response to the difference between RA and ECT,
determining if DA and ECT indicate a stable operating condition of the selected refrigeration cycle,
comparing D1 and C1,
and providing an alarm which indicates the return air temperature sensor should be checked when D1 exceeds C1, and the determining step finds that DA and ECT indicate a stable operating condition of the selected refrigeration cycle.

2. The method of claim 1 including the step of controlling the temperature of the served space in response RA in the absence of an alarm, and switching to controlling the temperature of the served space in response to DA after the step of providing an alarm has occurred.

3. The method of claim 1 wherein the step of determining if DA and ECT indicate a stable operating condition of the selected refrigeration cycle include the steps of:
providing a difference value D2 in response to the difference between SP and DA,
comparing D2 with a predetermined constant,
and determining if RA and ECT are on opposite sides of SP,
with a stable operating condition being determined when D2 exceeds the predetermined constant and RA and ECT are on opposite sides of SP.

4. The method of claim 1 wherein the selected refrigeration cycle is a cooling cycle, with the step of providing the difference value D1 including the step of subtracting ECT from RA, and with the step of determining if the DA and ECT indicate a stable operating condition of the selected cooling cycle including the steps of:
  subtracting DA from SP to provide a difference value D2,
  comparing D2 with a predetermined constant, and determining if ECT is below SP,
  with a stable cooling cycle being determined when D2 exceeds the predetermined constant and ECT is below SP.

5. The method of claim 1 wherein the selectable refrigeration cycles include cooling and heating cycles, with the step of providing difference value D1 and the step of comparing D1 with C1 being performed during a cooling cycle, and including the steps of:
  providing a difference value D3 during a heating cycle by subtracting RA from ECT,
  comparing D3 and C1 during a heating cycle,
  and providing an alarm during a heating cycle which indicates the return air temperature sensor should be checked when D3 exceeds C1, and the determining step finds that DA and ECT indicate the refrigeration system is operating in a stable heating cycle.

6. The method of claim 5 wherein the step of determining if DA and ECT indicate a stable operating condition during a heating cycle includes the steps of:
  subtracting SP from DA to provide a difference value D4,
  comparing D4 with a predetermined constant, and determining if ECT is above SP,
  with a stable heating cycle being determined when D4 exceeds the predetermined constant and ECT is above SP.

7. A method of checking the position and condition of a return air temperature sensor in a refrigeration system which draws air from a served space in heat exchange relation with an evaporator coil, and discharges conditioned air into the served space, to maintain the temperature of the served space in a predetermined temperature range adjacent to a predetermined set point temperature SP via selectable refrigeration cycles which include cooling and hot gas heating cycles, with the return air sensor providing a value RA responsive to the temperature of the air on the return side of the evaporator coil, and including a discharge air temperature sensor which provides a value DA responsive to the temperature of the air on the discharge side of the evaporator coil, an evaporator coil temperature sensor which provides a value ECT responsive to the temperature of the evaporator coil, and an ambient air temperature sensor which provides a value AA responsive to the temperature of the ambient air, comprising the steps of:
  providing a dynamic constant C1 having a magnitude responsive to AA and to the selected refrigeration cycle,
  providing a difference value D1 during a cooling cycle by subtracting ECT from RA,
  providing a difference value D3 during a heating cycle by subtracting RA from ECT,
  determining if DA and ECT indicate a stable operating condition of the selected refrigeration cycle,
  comparing D1 and C1 during a cooling cycle,
  comparing D3 and C1 during a heating cycle,
  and providing an alarm which indicates the return air temperature sensor should be checked when the difference value D1 exceeds the constant C1 during a cooling cycle, and when the difference value D3 exceeds the constant C1 during a heating cycle, and the determining step finds that the DA and ECT indicate a stable operating condition of the selected refrigeration cycle.

8. The method of claim 7 including the step of controlling the temperature of the served space in response RA in the absence of an alarm, and switching to controlling the temperature of the served space in response to DA after the step of providing an alarm has occurred.

9. The method of claim 7 wherein the selected refrigeration cycle is a cooling cycle, with the step of determining if DA and ECT indicate a stable operating condition of the selected cooling cycle including the steps of:
  subtracting DA from SP to provide a difference value D2,
  comparing D2 with a predetermined constant, and determining if ECT is below SP,
  with a stable cooling cycle being determined when D2 exceeds the predetermined constant and ECT is below SP.

10. The method of claim 7 wherein the selected refrigeration cycle is a heating cycle, with the step of determining if DA and ECT indicate a stable operating condition of the selected heating cycle including the steps of:
  subtracting SP from DA to provide a difference value D4,
  comparing D4 with a predetermined constant, and determining if ECT is above SP,
  with a stable heating cycle being determined when D4 exceeds the predetermined constant and ECT is above SP.

11. In a refrigeration system which draws air from a served space in heat exchange relation with an evaporator coil, and discharges conditioned air into the served space, to maintain the temperature of the served space in a predetermined temperature range adjacent to a predetermined set point temperature SP via selectable refrigeration cycles, with the refrigeration system including a return air temperature sensor which provides a value RA responsive to the temperature of the air on the return side of the evaporator coil, a discharge air temperature sensor which provides a value DA responsive to the temperature of the air on the discharge side of the evaporator coil, an evaporator coil temperature sensor which provides a value ECT responsive to the temperature of the evaporator coil, and an ambient air temperature sensor which provides a value AA responsive to the temperature of the ambient air, the improvement comprising:
  first means providing a dynamic constant C1 having a magnitude responsive to AA and the selected refrigeration cycle,
  second means providing a difference value D1 in response to the difference between RA and ECT,
  third means determining if DA and ECT indicate a stable operating condition of the selected refrigeration cycle,
  fourth means comparing D1 and C1,
  and fifth means providing an alarm which indicates the return air temperature sensor should be checked when the fourth means finds the difference D1 exceeds C1, and the third means finds that DA and ECT indicate a stable operating condition of the selected refrigeration cycle.

12. The refrigeration system of claim 11 wherein the refrigeration system includes means controlling the temperature of the served space in response to RA in the absence of an alarm by the fifth means, and means controlling the temperature of the served space in response to DA after the fifth means has provided an alarm.

13. The refrigeration system of claim 11 wherein the third means includes:
   means providing a difference value D2 in response to the difference between SP and DA,
   means comparing D2 with a predetermined constant,
   and means determining if RA and ECT are on opposite sides of SP,
   with a stable operating condition being determined when D2 exceeds the predetermined constant and RA and ECT are on opposite sides of SP.

14. The refrigeration system of claim 11 wherein the selected refrigeration cycle is a cooling cycle, with the second means including means subtracting ECT from RA, and with the third means including:
   means subtracting DA from SP to provide a difference value D2,
   means comparing D2 with a predetermined constant,
   and means determining if ECT is below SP,
   with a stable cooling cycle being determined when D2 exceeds the predetermined constant and ECT is below SP.

15. The method of claim 11 wherein the selectable refrigeration cycles include a cooling cycle and a heating cycle, with the second means providing D1 during a cooling cycle and with the fourth means comparing D1 and C1 during a cooling cycle, and including:
   means subtracting RA from ECT during a heating cycle to provide a difference value D3,
   and means comparing D3 and C1 during a heating cycle,
   and wherein the fifth means provides an alarm which indicates the return air sensor should be checked when D3 exceeds C1, and the third means finds that DA and ECT indicate a stable heating cycle.

16. The refrigeration system of claim 15 wherein the third means includes:
   means subtracting SP from DA during a heating cycle to provide a difference value D4,
   means comparing D4 with a predetermined constant,
   and means determining if ECT is above SP,
   with a stable heating cycle being determined when D4 exceeds the predetermined constant and ECT is above SP.

17. In a refrigeration system which draws air from a served space in heat exchange relation with an evaporator coil, and discharges conditioned air into the served space, to maintain the temperature of the served space in a predetermined temperature range adjacent to a predetermined set point temperature SP via selectable refrigeration cycles, which include cooling and hot gas heating cycles, and including a return air temperature sensor which provides a value RA responsive to the temperature of the air on the return side of the evaporator coil, a discharge air temperature sensor which provides a value DA responsive to the temperature of the air on the discharge side of the evaporator coil, an evaporator coil temperature sensor which provides a value ECT responsive to the temperature of the evaporator coil, and an ambient air temperature sensor which provides a value AA responsive to the temperature of the ambient air, the improvement comprising:
   first means providing a dynamic constant C1 having a magnitude responsive to AA and the selected refrigeration cycle,
   second means providing a difference value D1 during a cooling cycle by subtracting ECT from RA,
   third means determining, during a cooling cycle, if DA and ECT indicate a stable cooling cycle, with said third means including means providing a difference value D2 by subtracting DA from SP, and means for comparing D2 with a first predetermined constant,
   fourth means providing a difference value D3 during a heating cycle by subtracting RA from ECT,
   fifth means determining, during a heating cycle, if DA and ECT indicate a stable heating cycle, with said fifth means including means providing a difference value D4 by subtracting SP from DA, and means for comparing D4 with a second predetermined constant,
   sixth means comparing D1 and C1 during a cooling cycle,
   seventh means comparing D3 and C1 during a heating cycle,
   eighth means providing an alarm during a cooling cycle which indicates the return air temperature sensor should be checked when D1 exceeds C1, and the third means finds that DA and ECT indicate a stable cooling cycle,
   and ninth means providing an alarm during a heating cycle which indicates the return air temperature sensor should be checked when D3 exceeds C1, and the fifth means finds that DA and ECT indicate a stable heating cycle.

18. The refrigeration system of claim 17 wherein the refrigeration system includes means controlling the temperature of the served space in response to RA in the absence of an alarm, and means controlling the temperature of the served space in response to DA after an alarm has been provided.

19. The refrigeration system of claim 17 wherein the selected refrigeration cycle is a cooling cycle, with the third means including:
   means determining if ECT is below SP,
   with a stable cooling cycle being determined when D2 exceeds the first predetermined constant and ECT is below SP.

20. The refrigeration system of claim 17 wherein the selected refrigeration cycle is a heating cycle, with the fifth means including:
   means determining if ECT is above SP,
   with a stable heating cycle being determined when D4 exceeds the second predetermined constant and ECT is above SP.

* * * * *